(12) United States Patent
Chestnutt et al.

(10) Patent No.: US 12,508,706 B2
(45) Date of Patent: *Dec. 30, 2025

(54) CONSTRUCTION CONSTRAINED MOTION PRIMITIVES FROM ROBOT MAPS

(71) Applicant: Boston Dynamics, Inc., Waltham, MA (US)

(72) Inventors: Joel Chestnutt, Natick, MA (US); Gina Fay, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 293 days.

This patent is subject to a terminal disclaimer.

(21) Appl. No.: 18/332,602

(22) Filed: Jun. 9, 2023

(65) Prior Publication Data

US 2023/0321830 A1    Oct. 12, 2023

Related U.S. Application Data

(63) Continuation of application No. 16/884,669, filed on May 27, 2020, now Pat. No. 11,712,802.

(Continued)

(51) Int. Cl.
*B25J 19/02*     (2006.01)
*B25J 9/16*      (2006.01)
*G05D 1/00*      (2006.01)

(52) U.S. Cl.
CPC .......... *B25J 9/1664* (2013.01); *B25J 19/021* (2013.01); *G05D 1/0212* (2013.01); *G05D 1/08* (2013.01)

(58) Field of Classification Search
CPC ............. B25J 9/1664; B25J 19/021; G05D 2201/0207; G05D 1/0212; G05D 1/08
See application file for complete search history.

(56) References Cited

U.S. PATENT DOCUMENTS 8,515,612 B2    8/2013    Tanaka et al.
9,044,862 B2    6/2015    Kim et al.
(Continued)

FOREIGN PATENT DOCUMENTS

JP          2015080832 A    4/2015
WO    WO 2020/076422 A2    4/2020
(Continued)

OTHER PUBLICATIONS

Braun et al., "Topological Large-scale Off-road Navigation and Exploration RAVON at the European Land Robot Trial 2008". In IEEE/RSJ International Conference on Intelligent Robots and Systems. Oct. 10, 2009; pp. 4387-4392.
(Continued)

*Primary Examiner* — Dalena Tran
(74) *Attorney, Agent, or Firm* — Knobbe, Martens, Olson & Bear, LLP

(57) ABSTRACT

A method includes receiving sensor data of an environment about a robot and generating a plurality of waypoints and a plurality of edges each connecting a pair of the waypoints. The method includes receiving a target destination for the robot to navigate to and determining a route specification based on waypoints and corresponding edges for the robot to follow for navigating the robot to the target destination selected from waypoints and edges previously generated. For each waypoint, the method includes generating a goal region encompassing the corresponding waypoint and generating at least one constraint region encompassing a goal region. The at least one constraint region establishes boundaries for the robot to remain within while traversing toward the target destination. The method includes navigating the robot to the target destination by traversing the robot through each goal region while maintaining the robot within the at least one constraint region.

20 Claims, 11 Drawing Sheets

Related U.S. Application Data

(60) Provisional application No. 63/012,500, filed on Apr. 20, 2020.

(56) References Cited

U.S. PATENT DOCUMENTS

| | | | |
|---|---|---|---|
| 9,333,649 | B1 | 5/2016 | Bradski et al. |
| 9,744,672 | B2 | 8/2017 | Sun et al. |
| 9,844,877 | B1 | 12/2017 | Jules et al. |
| 10,035,266 | B1 | 7/2018 | Kroeger |
| 10,471,611 | B2 | 11/2019 | Dooley et al. |
| 10,606,269 | B2 | 3/2020 | Millard et al. |
| 11,124,401 | B1 * | 9/2021 | Jarvis ................... G05D 1/0225 |
| 11,179,847 | B2 * | 11/2021 | Kalakrishnan ........... B25J 9/163 |
| 11,231,279 | B2 * | 1/2022 | Sakai .................. G05D 1/0242 |
| 11,269,336 | B2 * | 3/2022 | Sadhu .................. G05D 1/0214 |
| 11,630,447 | B1 * | 4/2023 | Bhaskaran ........... G05D 1/0088 700/245 |
| 11,712,802 | B2 | 8/2023 | Chestnutt et al. |
| 11,927,961 | B2 | 3/2024 | Fay et al. |
| 2005/0066397 | A1 | 3/2005 | Hidai et al. |
| 2006/0167622 | A1 | 7/2006 | Bodin et al. |
| 2008/0009965 | A1 | 1/2008 | Bruemmer et al. |
| 2013/0178983 | A1 | 7/2013 | Watabe |
| 2016/0068267 | A1 | 3/2016 | Liu et al. |
| 2016/0247404 | A1 | 8/2016 | Srivastava et al. |
| 2018/0061251 | A1 | 3/2018 | Venkatraman et al. |
| 2018/0150077 | A1 | 5/2018 | Danielson et al. |
| 2018/0333853 | A1 | 11/2018 | Cousins et al. |
| 2019/0113927 | A1 | 4/2019 | Englard et al. |
| 2019/0220020 | A1 | 7/2019 | Macias et al. |
| 2020/0101971 | A1 | 4/2020 | Fan et al. |
| 2020/0117214 | A1 | 4/2020 | Jonak et al. |
| 2021/0132615 | A1 | 5/2021 | Passot et al. |
| 2021/0253130 | A1 | 8/2021 | Kumar et al. |
| 2021/0323153 | A1 | 10/2021 | Chestnutt et al. |
| 2021/0331315 | A1 | 10/2021 | Park et al. |

FOREIGN PATENT DOCUMENTS

| | | |
|---|---|---|
| WO | WO 2021/025707 A1 | 2/2021 |
| WO | WO 2021/216233 A1 | 10/2021 |
| WO | WO 2021/216254 A1 | 10/2021 |

OTHER PUBLICATIONS

Brito et al. "Model Predictive Contouring Control for Collision Avoidance in Unstructured Dynamic Environments." IEEE Robotics and Automation Letters. Jul. 2, 20192;4(4): 4459-4466.

Lai et al. "Safe Navigation of Quadrotors with Jerk Limited Trajectory." Front Info Tech & Electr Engin. Jan. 2019;20: 107-119.

Wardhana et al., "Enhanced Waypoint Graph for Path Planning in Virtual Worlds". In 2012 IEEE—Inter'l Conference Cyberworlds. Sep. 25, 2012;69-76.

International Search Report and Written Opinion dated Jun. 22, 2021 for Application No. PCT/US2021/024785, filed Mar. 30, 2021; 17 pages.

\* cited by examiner

CONSTRUCTION CONSTRAINED MOTION PRIMITIVES FROM ROBOT MAPS

CROSS REFERENCE TO RELATED APPLICATIONS

This application is a continuation of U.S. Non-Provisional application Ser. No. 16/884,669, filed May 27, 2020, which claims the benefit of U.S. Provisional Application No. 63/012,500, filed on Apr. 20, 2020. The disclosure of each of these prior applications is considered part of the disclosure of this application and are hereby incorporated by reference in its entirety.

TECHNICAL FIELD

This disclosure relates to construction constrained motion primitives from robot maps.

BACKGROUND

Robotic devices are increasingly being used to navigate constrained environments to perform a variety of tasks or functions. These robotic devices often need to navigate through these constrained environments without contacting the obstacles or becoming stuck or trapped. As these robotic devices become more prevalent, there is a need for real-time navigation and route planning that avoids contact with dynamic obstacles while successfully navigating to the destination.

SUMMARY

One aspect of the disclosure provides a method for constructing constrained motion primitives from robot maps. The method includes receiving, at data processing hardware, from at least one sensor in communication with the data processing hardware, sensor data of an environment about a robot while the robot traverses through the environment. The method also includes generating, by the data processing hardware, using the sensor data received while the robot traverses through the environment, a plurality of waypoints and a plurality of edges. Each edge connects a respective pair of the plurality of waypoints. After the robot traverses through the environment, the method includes receiving, at the data processing hardware, a target destination within the environment for the robot to navigate to. The method also includes determining, by the data processing hardware, a route specification based on a series of waypoints and corresponding edges for the robot to follow for navigating the robot to the target destination. The series of waypoints and corresponding edges are selected from the plurality of waypoints and the plurality of edges generated while the robot traversed through the environment. For each waypoint in the series of waypoints, the method includes generating, by the data processing hardware, a goal region encompassing the corresponding waypoint in the route specification. The method also includes generating, by the data processing hardware, at least one constraint region encompassing at least one goal region. The at least one constraint region establishes boundaries for the robot to remain within while traversing toward the target destination. The robot also includes navigating, by the data processing hardware, the robot to the target destination by traversing the robot through each goal region while maintaining the robot within the at least one constraint region.

Implementations of the disclosure may include one or more of the following optional features. In some implementations, receiving the target destination includes receiving the target destination from a user device in communication with the data processing hardware. Optionally, traversing the robot through each goal region includes traversing a center point of the robot through each goal region with a valid yaw configuration. At least one goal region in the route specification may include a yaw constraint configured to constrain a yaw of the robot within the at least one goal region.

In some examples, the method further includes, when generating the goal region encompassing the corresponding waypoint in the route specification, generating a target region encompassing the target destination. The target region includes a smaller area than at least one of the generated goal regions. In some implementations, the target region includes an area smaller than each of the generated goal regions. The at least one constraint region may encompass two goal regions.

Optionally, generating the at least one constraint region includes aligning the at least one constraint region with the corresponding edge connecting the pair of waypoints each encompassed by a respective one of the two goal regions encompassed by the at least one constraint region. At least one of the goal regions may be configured to cause the robot to align with a terrain feature prior to the robot traversing the terrain feature. In some examples, at least one of the goal regions is configured to ensure localization information from previously captured sensor data is valid.

In some implementations, the at least one constraint region includes route cost information. In some examples, the method includes receiving input from a user directing the robot to move about the environment and, as the robot moves about the environment, capturing the sensor data of the environment. The at least one sensor may include an image sensor comprising one or more of a stereo camera, a scanning light-detection and ranging (LIDAR) sensor, or a scanning laser-detection and ranging (LADAR) sensor.

Another aspect of the disclosure provides a system for constructing constrained motion primitives from robot maps. The system includes data processing hardware and memory hardware in communication with the data processing hardware. The memory hardware stores instructions that when executed on the data processing hardware cause the data processing hardware to perform operations. The operations include receiving, from at least one sensor in communication with the data processing hardware, sensor data of an environment about a robot while the robot traverses through the environment. The operations also include generating, using the sensor data received while the robot traverses through the environment, a plurality of waypoints and a plurality of edges. Each edge connects a respective pair of the plurality of waypoints. After the robot traverses through the environment, the operations also include receiving a target destination within the environment for the robot to navigate to. The operations also include determining a route specification based on a series of waypoints and corresponding edges for the robot to follow for navigating the robot to the target destination. The series of waypoints and corresponding edges are selected from the plurality of waypoints and the plurality of edges generated while the robot traversed through the environment. For each waypoint in the series of waypoints, the operations include generating a goal region encompassing the corresponding waypoint in the route specification. The operations also include generating at least one constraint region encompassing at least one goal region. The at least one constraint region establishes boundaries for the robot to remain within while traversing toward the target destination. The robot also includes navigating the robot to the target destination by traversing the robot through each goal region while maintaining the robot within the at least one constraint region.

This aspect may include one or more of the following optional features. In some implementations, receiving the target destination includes receiving the target destination from a user device in communication with the data processing hardware. Optionally, traversing the robot through each goal region includes traversing a center point of the robot through each goal region with a valid yaw configuration. At least one goal region in the route specification may include a yaw constraint configured to constrain a yaw of the robot within the at least one goal region.

In some examples, the operations further include, when generating the goal region encompassing the corresponding waypoint in the route specification, generating a target region encompassing the target destination. The target region includes a smaller area than at least one of the generated goal regions. In some implementations, the target region includes an area smaller than each of the generated goal regions. The at least one constraint region may encompass two goal regions.

Optionally, generating the at least one constraint region includes aligning the at least one constraint region with the corresponding edge connecting the pair of waypoints each encompassed by a respective one of the two goal regions encompassed by the at least one constraint region. At least one of the goal regions may be configured to cause the robot to align with a terrain feature prior to the robot traversing the terrain feature. In some examples, at least one of the goal regions is configured to ensure localization information from previously captured sensor data is valid.

In some implementations, the at least one constraint region includes route cost information. In some examples, the operations include receiving input from a user directing the robot to move about the environment and, as the robot moves about the environment, capturing the sensor data of the environment. The at least one sensor may include an image sensor comprising one or more of a stereo camera, a scanning light-detection and ranging (LIDAR) sensor, or a scanning laser-detection and ranging (LADAR) sensor.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
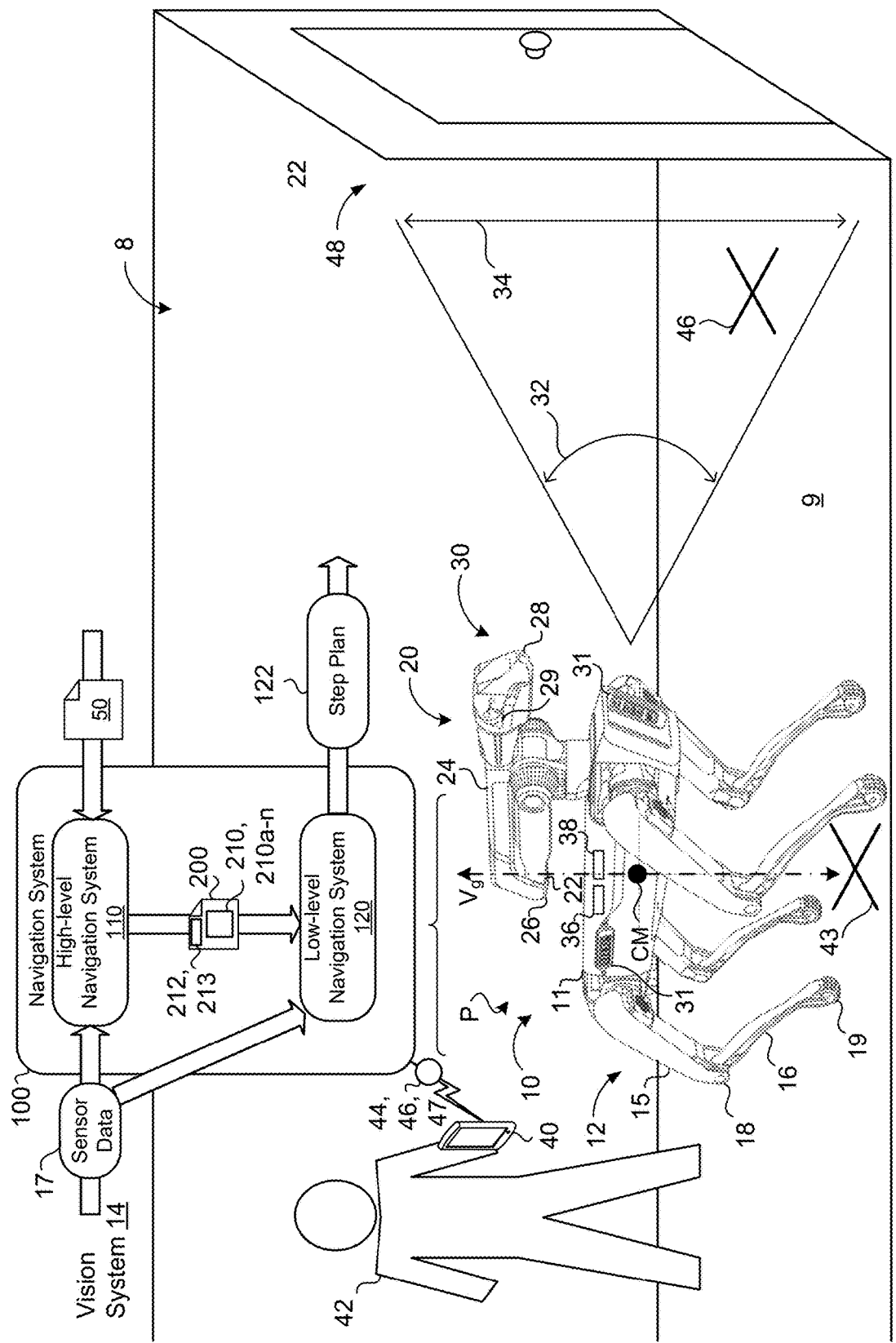
FIG. 1 is a schematic view of an example system that provides constrained robot autonomy language.

As robotic devices (also referred to as "robots") become more prevalent, there is an increasing need for the robots to autonomously navigate environments that are constrained in a number of ways. Often, the robots rely on high-level map data that stores information relating to large and/or static objects (e.g., walls, doors, etc.). When given a destination goal, the robot will often first plot an initial path or course from this high-level map using a high-level navigation system to navigate the static obstacles and then rely on a local navigation system that gathers local navigation data to navigate around small and dynamic objects encountered while travelling.

While navigating, the robot requires a way for the high-level components of the navigation system, which have access to large-scale navigation information, to communicate goals, context, and intentions to lower-level navigation and obstacle avoidance systems so that the lower-level systems (i.e., local systems) may make more informed decisions about how to locally navigate the robot in a safe and efficient manner. Conventional techniques of representing goals as single poses lose the required context needed by the lower levels to make these optimizations and decisions. By including this context, the lower-level navigation systems can navigate the robot in a safe manner while still achieving the goals set by the high-level navigation system.

Typically, the high-level navigation system, when providing the initial path to the local navigation system (i.e., the navigation system that operates on a small, local map of the robot's environment versus a building-scale map of the high-level navigation system), most, if not all, context related to the path and destination is lost. That is, conventional techniques may specify the goals of a route, but the execution of the route is limited in how the local navigation system can respond to disturbances or obstacles along its path. The local navigation system lacks the context or information to determine whether a particular deviation from the goal is acceptable or even preferred. As a result, conventional techniques output local trajectories directly based on the map and route details, as well as the state of the robot. This over-constrains the systems that follow this trajectory (e.g., the local navigation system), because the systems are not aware of the amount of freedom available to deviate from the trajectory.

Implementations herein are directed toward systems and methods for a navigation system that utilizes a route specification language that includes additional context in a compact representation that allows a local navigation system (e.g., obstacle avoidance systems) to make appropriate decisions and optimizations. For example, the route specification language may represent constraints of staircases, including yaw and position. The route specification language may represent how near the robot must get to previously recorded sensor data in order to localize to the sensor data. In yet another example, the language may specify that the robot should not change its yaw or orientations in certain situations or locations.

By including relevant context and navigational information, the robot may perform tasks in a safer manner. For example, the robot provides larger safety margins and smoother paths, because the local navigation system has the necessary information to know acceptable ways to steer while still achieving the goals commanded by the higher-level navigation system. Additionally, the language enables new applications to be built by allowing new systems to specify goals and requirements in a more precise manner than was previously possible, while still allowing the local navigation system the freedom to adjust the robot in ways that do not affect the goals and requirements.

Referring to FIG. 1, a robot or robotic device 10 includes a body 11 with two or more legs 12 and executes a navigation system 100 for enabling the robot 10 to navigate a constrained environment 8. Each leg 12 is coupled to the body 11 and may have an upper portion 15 and a lower portion 16 separated by a leg joint 18. The lower portion 16 of each leg 12 ends in a foot 19. The foot 19 of each leg is optional and the terminal end of the lower portion of one or more of the leg 12 may be coupled to a wheel or the distal end of each leg 12 may directly contact the a ground surface 9. The robot 10 has a vertical gravitational axis Vg along a direction of gravity, and a center of mass CM, which is a point where the weighted relative position of the distributed mass of the robot sums to zero. The robot 10 further has a pose P based on the CM relative to the vertical gravitational axis Vg (i.e., the fixed reference frame with respect to gravity) to define a particular attitude or stance assumed by the robot 10. The attitude of the robot can be defined by an orientation or an angular position of the robot 10 in space. Movement by the legs 12 relative to the body 11 alters the pose P of the robot 10 (i.e., the combination of the position of the CM of the robot and the attitude or orientation of the robot 10).

In some implementations, the robot 10 further includes one or more appendages, such as an articulated arm 20 disposed on the body 11 and configured to move relative to the body 11. The articulated arm 20 may have five-degrees or more of freedom. Moreover, the articulated arm 20 may be interchangeably referred to as a manipulator arm or simply an appendage. In the example shown, the articulated arm 20 includes two portions 22, 24 rotatable relative to one another and also the body 11; however, the articulated arm 20 may include more or less portions without departing from the scope of the present disclosure. The first portion 22 may be separated from second portion 24 by an articulated arm joint 26. An end effector 28, which may be interchangeably referred to as a manipulator head 28, may be coupled to a distal end of the second portion 24 of the articulated arm 20 and may include one or more actuators 29 for gripping/grasping objects.

The robot 10 also includes a vision system 30 with at least one imaging sensor or camera 31, each sensor or camera 31 capturing image data or sensor data 17 of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10.

The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other three-dimensional (3D) volumetric image sensor (or any such combination of sensors).

The vision system 30 provides image data or sensor data 17 captured by the cameras or sensors 31 to data processing hardware 36 of the robot 10. The data processing hardware 36 is in digital communication with memory hardware 38 that stores instructions executable by the data processing hardware for performing operations. While the example shown depicts the data processing hardware 36 and the memory hardware 38 residing on the robot 10, other configurations may include the data processing hardware 36 and the memory hardware 38 implemented on a remote system in communication with the robot 10. The remote system may be a single computer, multiple computers, or a distributed system (e.g., a cloud environment) having scalable/elastic computing resources and/or storage resources. A navigation system 100 of the robot 10 executes on the data processing hardware 36. The navigation system 100 may include a high-level navigation system 110 and a local navigation system 120.

In some implementations, the navigation system 100 receives a navigation command 44 to navigate the robot 10 to a mission destination 46 (also referred herein as a target destination 46) within the environment 8 of the robot 10. The navigation command 44 may specify mission parameters for performing one or more actions/behaviors by the robot 10 at the mission destination 46. The navigation system 100 may receive the navigation command 44 from a user device 40 associated with a user 42. The user 42 may use the user device 40 to control/navigate the robot 10 around the environment 8 and may be any appropriate device such as a tablet, a mobile phone, a laptop or other computing system, or a dedicated controller. The mission destination 46 indicates a target location within the environment 8 that the navigation system 100 must navigate the robot 10 to. In the example shown, the mission destination 46 indicates a location in front of a door 48 in preparation for the robot 10 to open the door 48.

In some implementations, the navigation system 100 includes the high-level navigation system 110 that receives map data 50 (i.e., high-level navigation data representative of locations of static obstacles in an area the robot 10 is to navigate). The high-level navigation system 110 may use the map data 50 and the navigation command 44 to generate a route specification 200 for navigating the robot 10 from a current location 43 to the mission destination 46. The route specification 200 generated by the high-level navigation system 110 includes a series of route segments 210, 210a-n (FIG. 2), with each route segment 210 including an initial path 310 (FIG. 3) for the robot 10 to follow while traversing the corresponding route segment 210. Each segment 210, as discussed in more detail below, may include additional constraints 212 for constraining the robot 10 while traversing the environment 8.

With continued reference to FIG. 1, the high-level navigation system 110 sends the route specification 200 to the local navigation system 120. The local navigation system 120, based on the route specification 200 and the sensor data 17, generates a step plan 122 that plots each individual step of the robot 10 to navigate from the current location 43 of the robot 10 to the mission destination 46. Using the step plan 122, the robot 10 maneuvers through the environment 8 (e.g., around local and dynamic obstacles) by placing the feet 19 or distal ends of the leg 12 on the ground surface 9 at locations specified by the step plan 122.

In some examples, at least a portion of the navigation system 100 executes on a remote device in communication with the robot 10. For instance, the high-level navigation system 110 may execute on a remote device to generate the route specification 200 and the local navigation system 120 may execute on the robot 10 to receive the route specification 200 from the remote device. Optionally, the entire navigation system 100 may execute on a remote device and the remote device may control/instruct the robot 10 to maneuver the environment 8 based the step plan 122. In additional examples, the remote device includes a remote computing device (e.g., a cloud-based server) in communication with the user device 40 and the robot 10.

Figure 2:
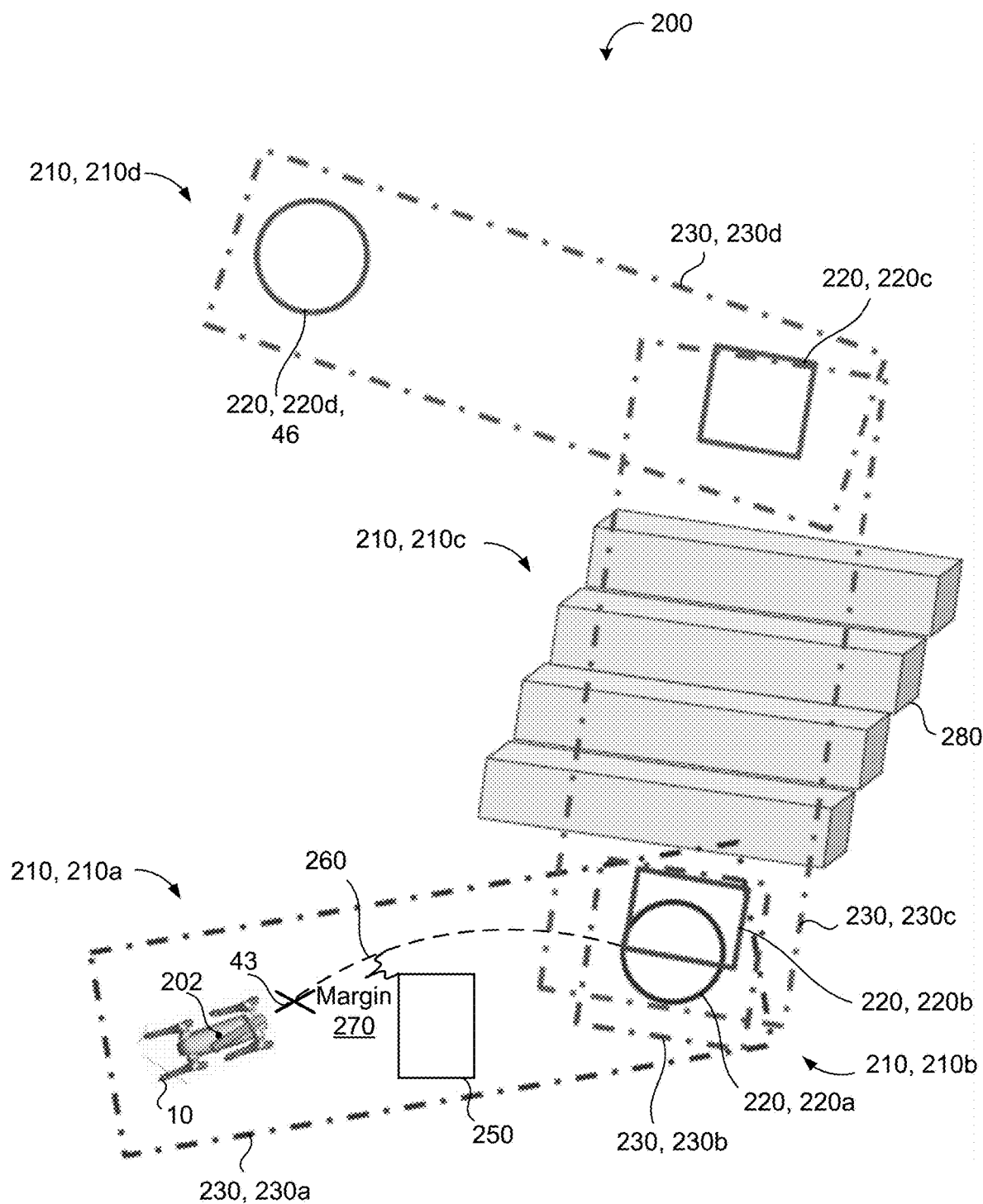
FIG. 2 is a schematic view of exemplary components of a route specification.

Referring now to FIG. 2, an exemplary route specification 200 provides the local navigation system 120 with context to aid in navigating the robot 10 from a current location 43 in the environment 8 to the mission destination 46 in the environment. Here, the route specification 200 includes a series of four route segments 210, 210a-d. The route segments 210 represent sequential portions of a path the robot 10 must traverse in order to successfully navigate to the mission destination 46. In some examples, each route segment 210 in the series of route segments 210 includes a corresponding goal region 220, 220a-d. Each goal region 220 represents an area that at least a portion of the robot 10 enters while traversing the corresponding respective route segment 210. That is, in order to successfully "pass" or "succeed" the goal region 220 and move on to the next segment 210, at least some portion of the robot 10 must enter the area designated by the goal region 220. In some examples, the goal region 220 represents an area that a center point 202 of the robot 10 must enter while traversing the respective route segment 210. Accordingly, the robot 10 is to sequentially traverse each route segment 210 in the series of route segments 210a-d by passing through each respective goal region 220 while navigating to the mission destination 46 in the environment 8. In some examples, each route segment 210 in the series of route segments overlaps at least one other route segment 210 in the series of route segments 210. In additional examples, each goal region 220 includes a convex shape in SE2 space. SE2 is a coordinate system that includes yaw with standard Cartesian coordinates (i.e., an x coordinate, a y coordinate, and yaw).

Optionally, each segment 210 includes a constraint region 230, 230a-d that encompasses the respective goal region 220 of the segment 210. The constraint region 230 establishes boundaries for the robot 10 to remain within while traversing toward the goal region 220 of the corresponding route segment 210. That is, the constraint region 230 provides boundaries that allows the local navigation system 120 to freely navigate the robot 10 within while traversing the segment 210. For example, in FIG. 2, an obstacle 250 in the first route segment 210a impedes a direct path from the current location 43 of the robot 10 to the goal region 220a for the corresponding first route segment 210a. However, the constraint region 230a provides the local navigation system 120 with the context to understand that the robot 10 may safely navigate around the obstacle 250 using path 260 without failing the mission. In some examples, the constraint region 230 encompassing the goal region 220 for the corresponding route segment 210 also encompasses the goal region 220 associated with another one of the route segments 210 in the series of route segments 210 that overlaps the corresponding route segment 210. For instance, in the example shown in FIG. 2, the constraint region 230a encompassing the goal region 220a for the route segment 210a also encompasses the goal region 220b for the route segment 210b that overlaps the route segment 210a.

As another advantage, the local navigation system 120 may dynamically adjust an amount of margin 270 of distance between the robot 10 and obstacles 250 in response to the constraint region 230. For example, when the constraint region 230 is large, the local navigation system 120 may provide additional margin 270 between the robot 10 and the obstacle 250 to provide for safer and smoother avoidance of the obstacle 250. In other examples, when the constraint region 230 is small, the high-level navigation system 110 communicates to the local navigation system 120 that the mission requires a smaller margin 270 between the robot 10 and the obstacle 250 and therefore the local navigation system 120 will navigate the robot 10 closer to the obstacle 250 to remain within the constraint region 230.

With continued reference to FIG. 2, the exemplary route specification 200 includes four route segments 210a-d that the robot 10 must sequentially traverse when navigating to the mission destination 46. For instance, the robot 10 traverses the first route segment 210a via the constraint region 230a to the corresponding goal region 220a adjacent to the bottom of a staircase 280 in the environment 8. The route segment 210b provides the goal region 220b and the constraint region 230b to align the robot 10 with the staircase 280. The route segment 210c and the constraint region 230c bound the robot within the staircase 280 to allow the robot 10 to traverse up the staircase 280 to the corresponding goal region 220c adjacent to the top of the staircase 280. Once the robot reaches the top of the staircase 280 by entering the goal region 220c, the robot 10 traverses the fourth route segment 210d via the constrain region 230d to the goal region 220d (which, in this case, is also the mission destination 46). Thus, in some examples, the goal region 220 for the last route segment 210 in the series of route segments encompasses the mission destination 46.

Figure 3:
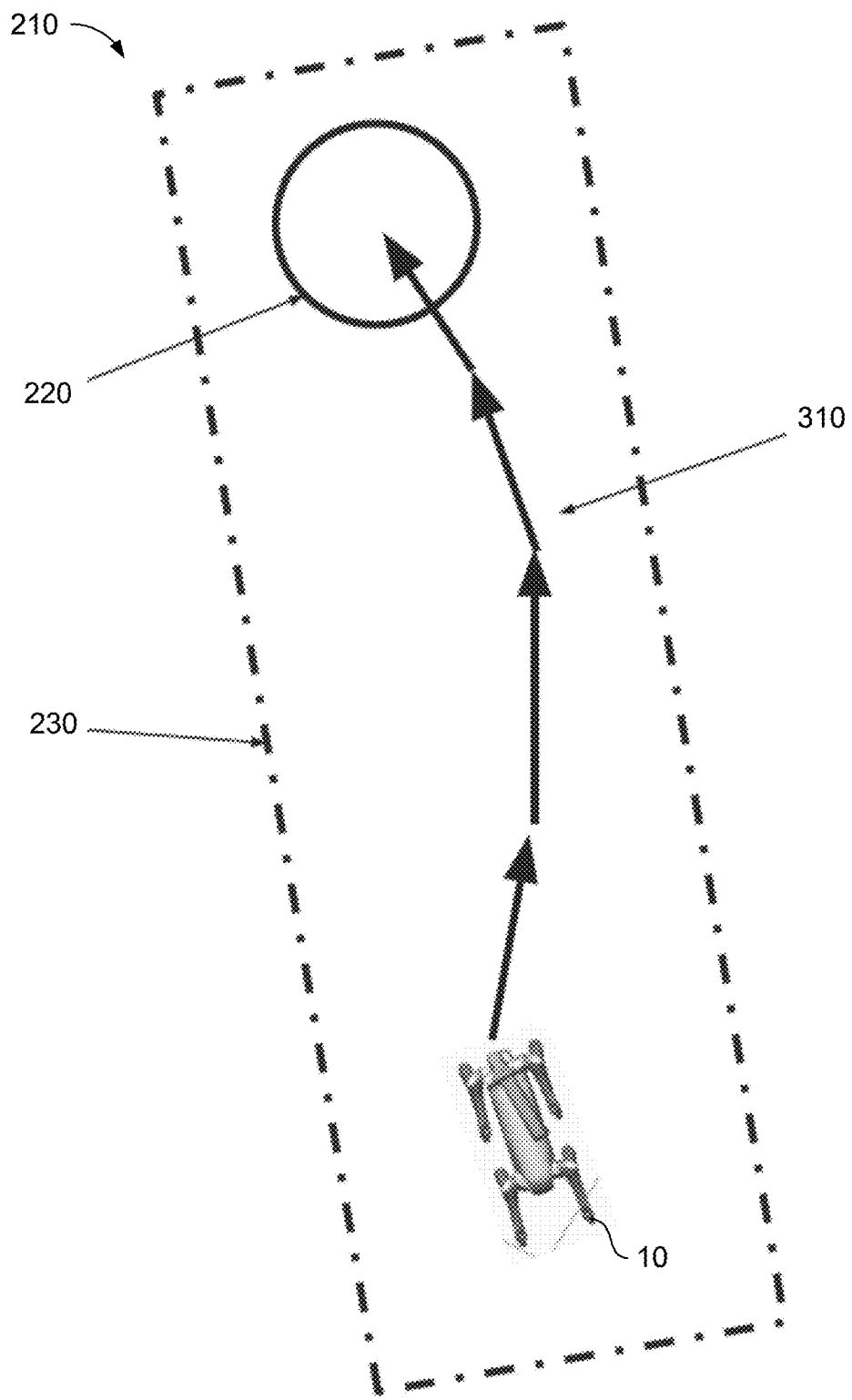
FIG. 3 is a schematic view of a route specification including an initial path.

Referring now to FIG. 3, a route segment 210 specified by a route specification 200 may provide the local navigation system 120 with an initial path 310 for the robot 10 to follow while traversing the corresponding route segment 210. The initial path 310 may be a "best guess" by the high-level navigation system 110 that does not take into account dynamic objects or obstacles that require local navigation to avoid. The local navigation system 120 may use the initial path 310 as a starting point for navigation, but deviate from the initial path 310 while remaining within the constraint region 230 as the environment 8 demands. In some examples, both goal regions 220 and constraint regions 230 are convex shapes to simplify problem solving for the navigation system 100. A convex shape does not self-intersect and is a shape in which no line segment between two points on the boundary ever go outside of the shape.

Each route segment 210 may include any number of segment-specific constraints 212. For example, each route segment 210 includes one or more of goal costs, velocity bounds, position constraints, position costs, velocity costs, yaw constraints/bounds, and/or mobility parameters. A cost may be associated with a "soft" constraint. That is, the robot 10 may violate a constraint with an associated cost under certain circumstances. The higher the cost, the harder the robot 10 (i.e., the navigation system 100) will try to avoid violating the constraint. For example, a velocity cost may deter the navigation system 100 from exceeding a minimum velocity threshold and/or a maximum velocity threshold while traversing the corresponding route segment 210. The velocity bounds may include angular velocity bounds, lateral velocity bounds, and longitudinal bounds. Likewise, position costs may encourage the robot 10 to maintain certain positions. Yaw constraints may impose yaw limitations on the robot 10. For example, in narrow corridors or near ledges the robot 10 may be restricted from turning. Mobility parameters may categorize one or more surfaces covered by the corresponding route segment 210. For example, the categorization includes stairs or flat ground. That is, a route segment 210 (e.g., the route segment 210c of FIG. 2) that causes the robot 10 to traverse stairs may include a mobility parameter that categorizes the route segment 210 as stairs to allow the local navigation system 120 to react accordingly.

As the robot 10 navigates from one route segment 210 to a next route segment 210 specified by the route specification 200, only the segment-specific constraints 212 associated with the route segment 210 that the robot 10 is currently traversing apply. This is opposed to global constraints 213 which the robot 10 must abide by no matter which route segment 210 the robot 10 is traversing. In some examples, the navigation system 100 includes only segment-specific constraints 212, while in other examples, the navigation system 100 includes a hybrid of segment-specific constraints 212 and global constraints 213. That is, the high-level navigation system 110 may impose both segment-specific constraints 212 and at least one global constraint 213 that constrains the robot 10 while traversing each segment 210. For instance, world-based constraints (e.g., stairs) may be better modeled with global constraints 213.

Figure 4:
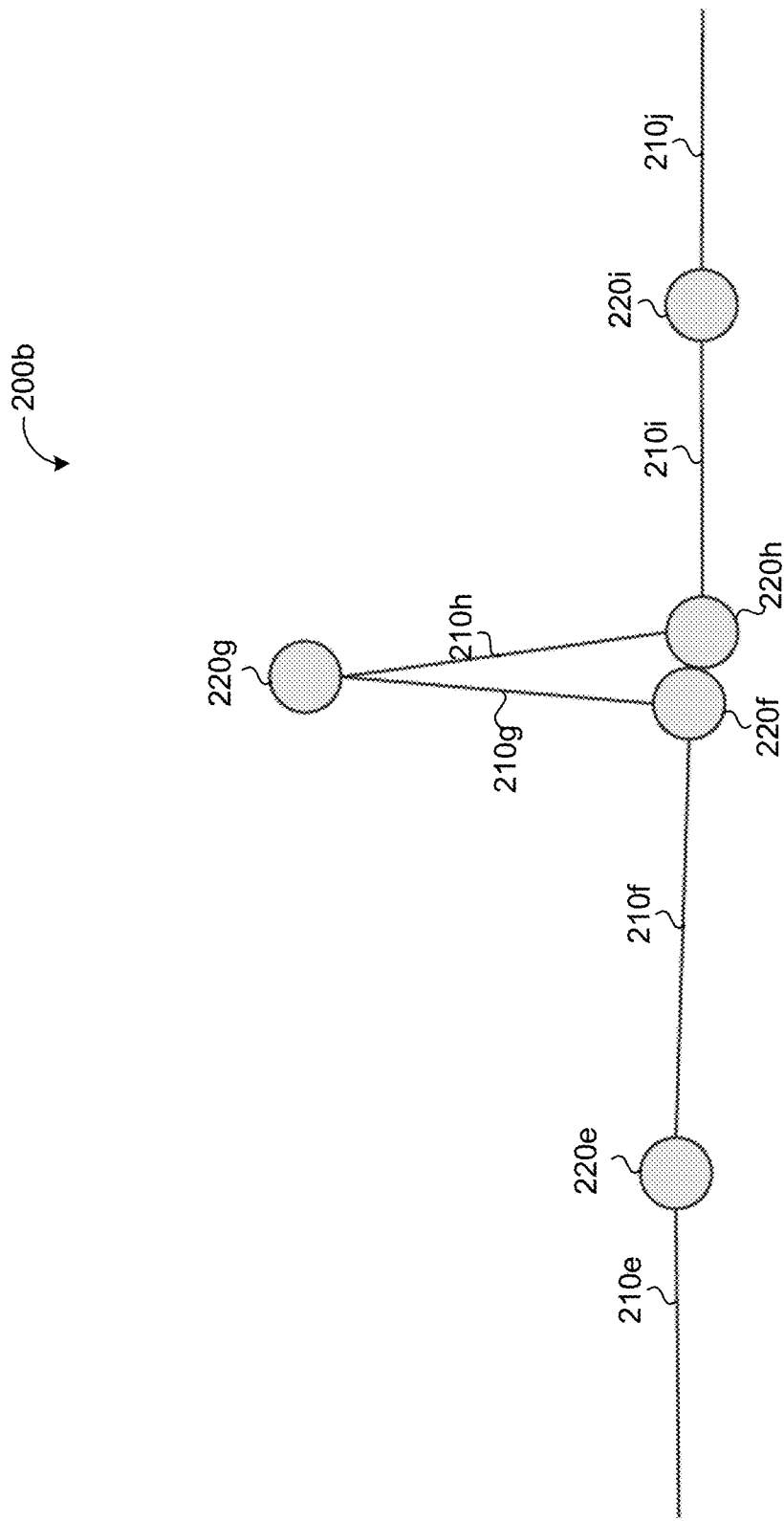
FIG. 4 is a schematic view of a route specification including a plurality of sequential goal regions.

Referring now to FIG. 4, another exemplary route specification 200 illustrates that the navigation system 100 does not use sequential composition. That is, the navigation system 100 may require the robot 10 to pass through each goal region 220 without skipping any goal region 220. Here, the robot 10 must first pass through goal region 220e during route segment 210e, then while traversing route segment 210f, pass through goal region 220f, then while traversing route segment 210g, pass through goal region 220g, and so on and so forth until the robot reaches the mission destination 46 (not shown).

Figure 5A:
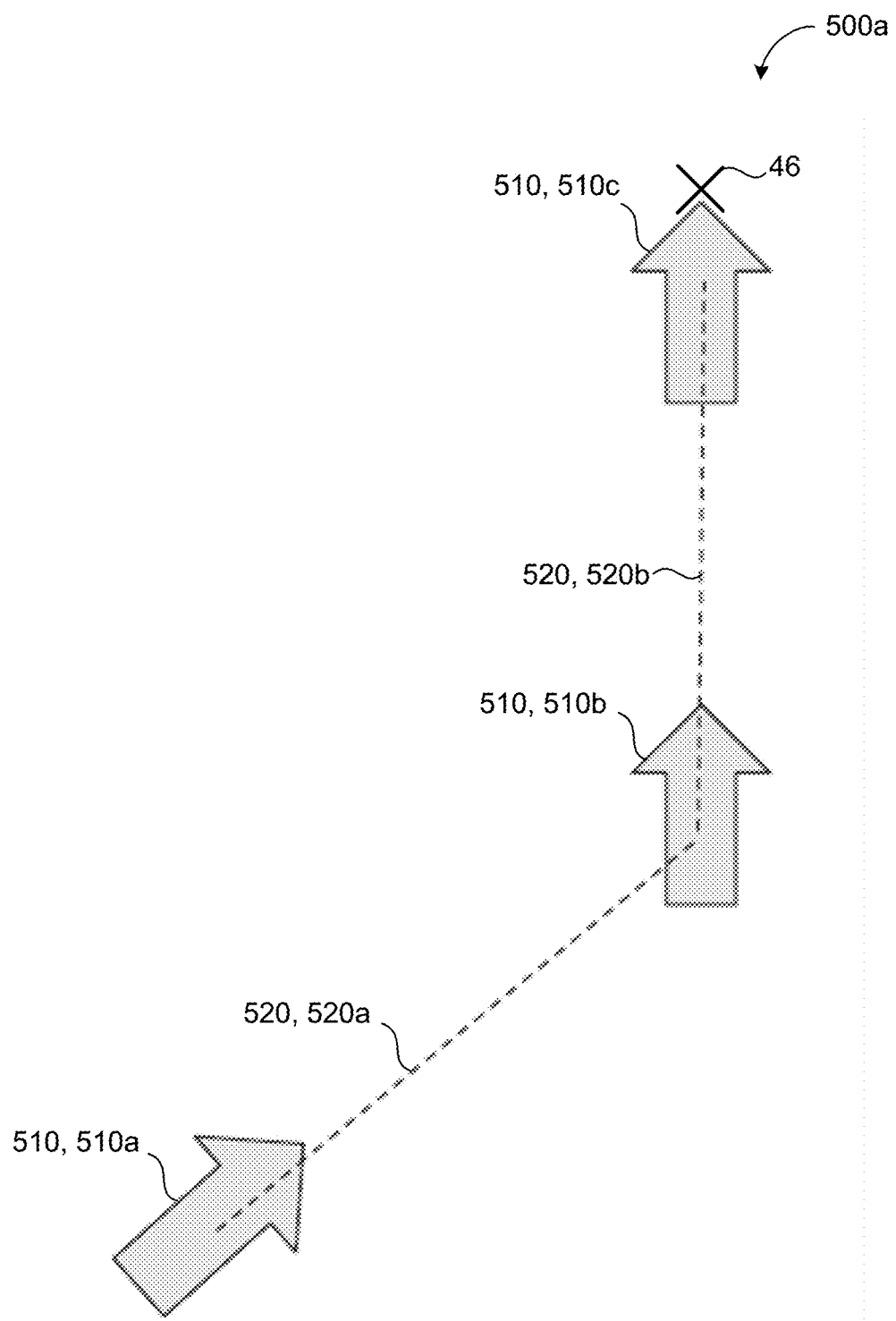
FIGS. 5A-5C are schematic views of a route specification generated from a previously generated map.
Figure 5B:
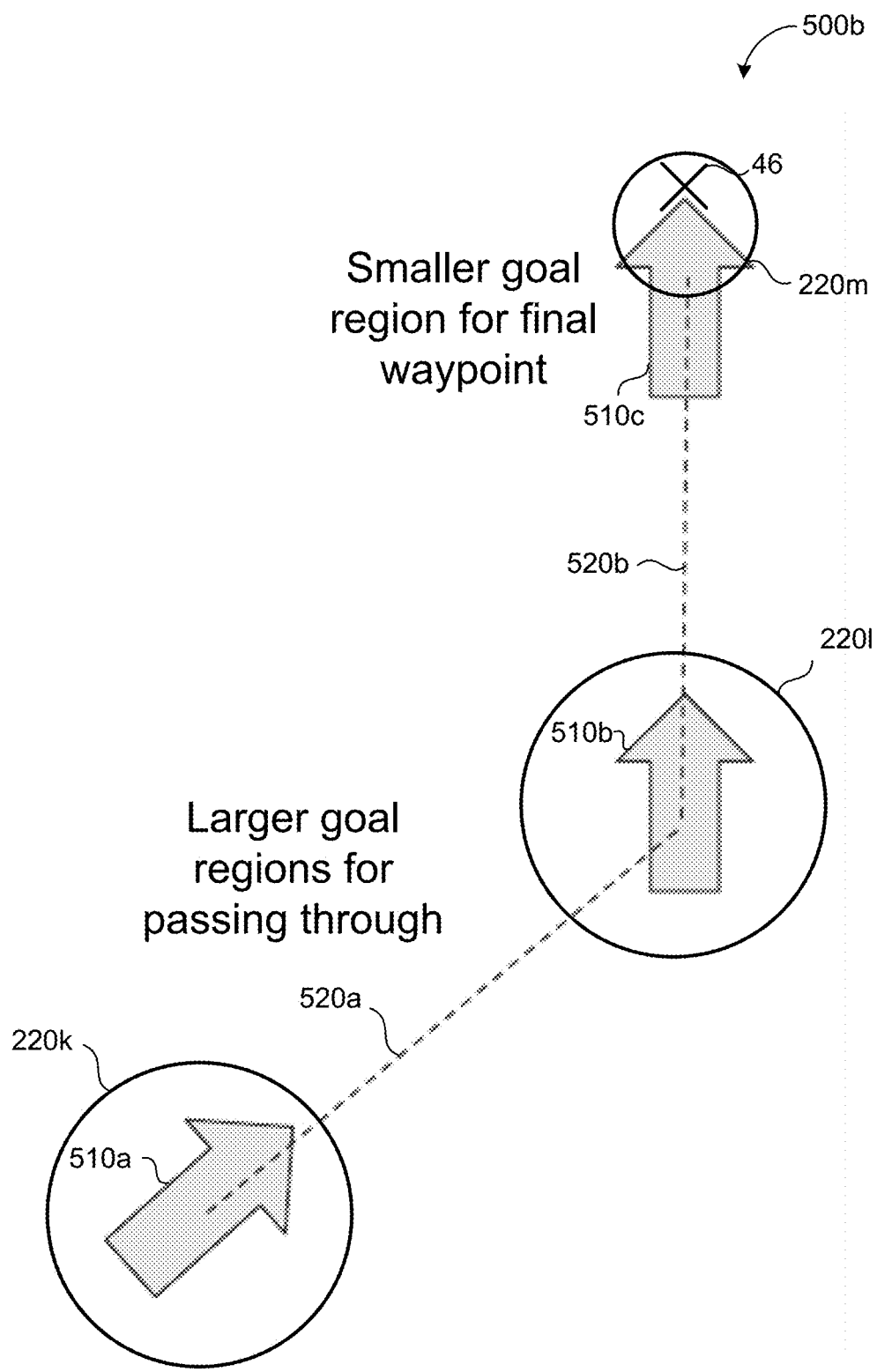
Figure 5C:
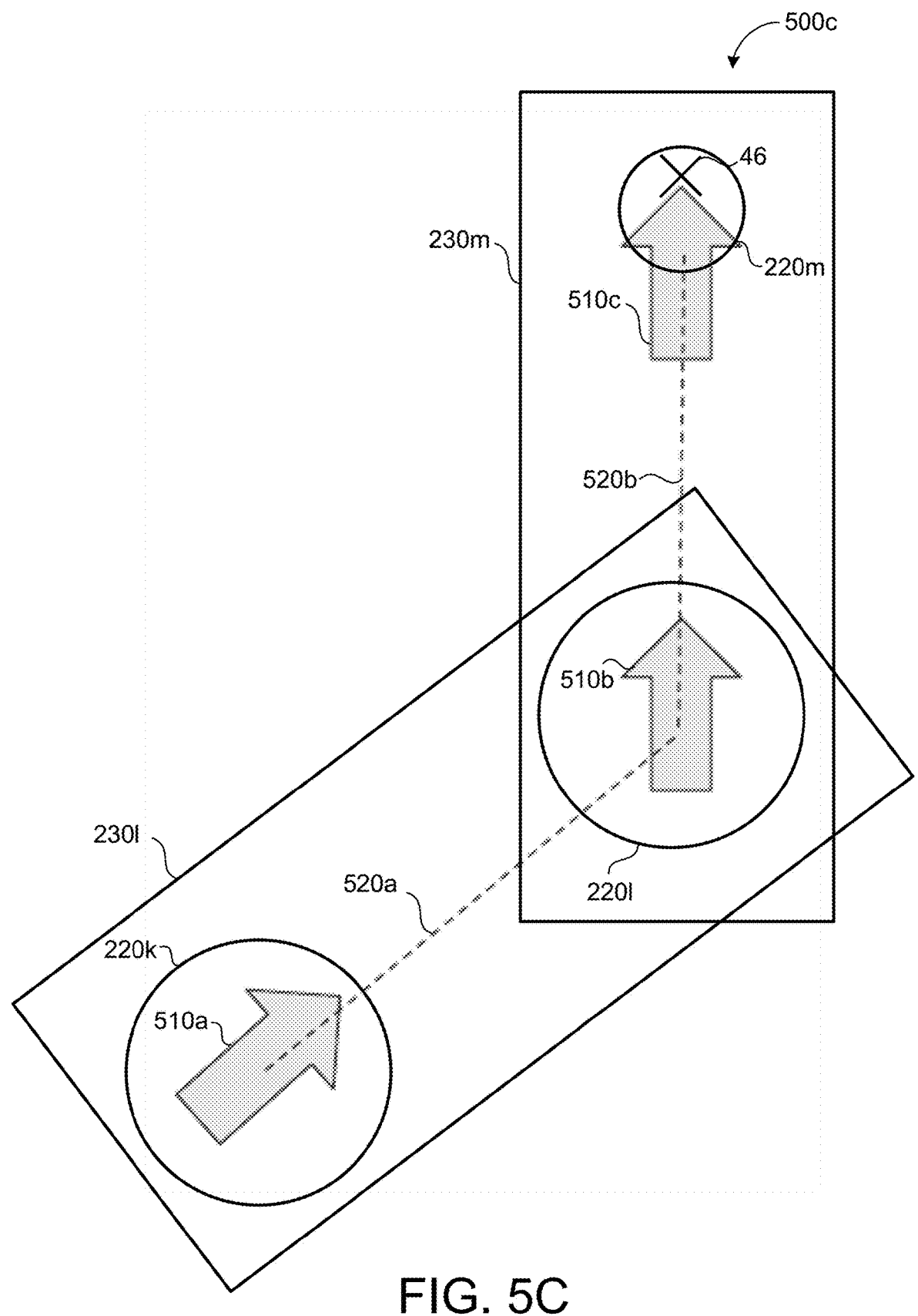

Referring now to FIGS. 5A-5C, in some implementations, the navigation system 100 generates the route specification 200 from a previously recorded map 50 (FIG. 1). The previously recorded map 50 includes a plurality of waypoints 510, 510a-n and a plurality of edges 520, 520a-n generated by the robot 10 using sensor data 17 while previously traversing through the environment 8. Each edge 520 connects a respective pair of the plurality of waypoints 510. For example, the user 42 may command the robot 10 (via the user device 40) to traverse the environment 8, and as the robot moves about the environment, the robot 10 captures the sensor data 17 of the environment 8 for initial map generation and localization (e.g., simultaneous localization and mapping (SLAM)).

After the robot 10 traverses the environment 8 and generates the map 50, the navigation system 100 receives a target destination (interchangeably referred to as "mission destination") 46 within the environment 8 for the robot 10 to navigate to. In some examples, the robot 10 receives a navigation request 47 (FIG. 1) to navigate from the current location 43 in the environment 8 to the mission destination 46 in the environment 8. The high-level navigation system 110 determines the route specification 200 which may include a series of waypoints 510 and corresponding edges 520 for the robot 10 to follow for navigating the robot 10 to the target destination 46. Here, the series of waypoints 510 and corresponding edges 520 may be selected from the plurality of waypoints 510 and the plurality of edges 520 generated while the robot 10 previously traversed through the environment 8 during map generation. That is, the high-level navigation system 110 selects a subset of the plurality of waypoints 510 and associated edges 520 from the previously generated map 50 that best navigate the robot 10 to the mission destination 46. In the example 500a of FIG. 5A, the high-level navigation system 110 selects waypoints 510a-c connected by edges 520a, 520b to navigate the robot to or near the mission destination 46.

For each waypoint 510 in the series of waypoints 510 in the route specification 200, the high-level navigation system 110 generates a goal region 220 encompassing the corresponding waypoint 510 in the route specification 200. In the example 500b of FIG. 5B, the high-level navigation system 110 generates goal regions 220k-m encompassing the waypoints 510a-c. Specifically, the goal region 220k encompasses the waypoint 510a, the goal region 220l encompasses the waypoint 510b, and the goal region 220m. In some implementations, the high-level navigation system 110 passes additional context to the local navigation system 120 via a size of each goal region 220. That is, when generating the goal region 220 encompassing the corresponding waypoint 510 in the route specification 200, the high-level navigation system 110 generates a goal region 220 (i.e., a target region) encompassing the target destination 46 that includes a smaller area than at least one of the generated goal regions 220. In some implementations, an area of the goal region 220 that encompasses the target destination 46 has an area that is smaller than each of the other goal regions.

For example, waypoints 510a, 510b are intermediate waypoints 510 on the way to the mission destination 46 and because there is no need for the robot 10 to precisely arrive at each waypoint 510, the high-level navigation system 110 enlarges the size of the goal regions 220k, 220l to allow the local navigation system 120 more flexibility in passing each waypoint 510a, 510b. On the other hand, the waypoint 510c coincides at or near the mission destination 46 and here the high-level navigation system 110 has decreased the size of the goal region 220m to ensure that the local navigation system 120 navigates the robot 10 to the mission destination 46. Because the local navigation system 120 must navigate a portion of the robot 10 (e.g., the center point of the robot) to a space in the environment 8 that is represented by the interior of the goal region 220, the size of the goal region 220 establishes how near the waypoint 510 the robot 10 will get.

Each goal region 220 may include a yaw bound or yaw constraint that the robot must conform to before successfully satisfy or complete the respective goal region 220 and move on to the next segment 210. That is, the yaw bound may force the robot 10 to enter a specific yaw configuration prior to leaving the goal region 220 before satisfying the goal region 220 and/or segment 210 while additionally or alternatively, the yaw bound forces the robot 10 to enter the specific yaw configuration before entering the goal region 220. For example, when a goal region 220 is located at the bottom of a staircase (e.g., the goal region 220b of FIG. 2), a yaw bound associated with the goal region 220 ensures that the robot 10 is properly aligned with the staircase prior to entering the goal region 220 and/or prior to leaving the goal region 220 and climbing the stairs. Thus, in some examples, one or more of the goal regions 220 are configured to cause the robot 10 to align with an obstacle prior to the robot 10 traversing the obstacle.

In some implementations, the high-level navigation system 110 generates at least one constraint region 230 encompassing at least one goal region 220. The constraint region may encompass a plurality of goal regions 220 (e.g., two goal regions 220). The at least one constraint region 230 establishes the boundaries for the robot 10 to remain within while traversing toward the target destination or mission destination 46. In example 500c of FIG. 5C, the constraint region 230l encompasses the goal regions 220k, 200l while the constraint region 230m encompasses the goal regions 220l, 220m. The constraint regions 230l, 230m bound the areas the robot 10 may enter while the local navigation system 120 navigates the robot around obstacles to the mission destination 46. Thus, the local navigation system 120 may navigate the robot 10 to the target destination or mission destination 46 by traversing the robot 10 through each goal region 220 (e.g., a center point of the robot 10) while maintaining the robot 10 within the constraint regions 230. The constraint region 230 may be any shape. Multiple goal regions 220 may overlap. In some examples, each segment 210 includes only a single constrained region 230 and a single goal region 220.

Optionally, the high-level navigation system 110, when generating the constraint regions 230, generates each constraint region 230 such that the respective constraint region 230 is aligned with the corresponding edge 520 connecting the pair of waypoints 510 each encompassed by a goal region 220 and the constraint region 230. In the example shown, the constraint region 230l is aligned with the edge 520a while the constraint region 230m is aligned with the edge 520b.

In some implementations, one or more of the goal regions 220 provide localization information to the robot 10. For example, the underlying waypoint 510 encompassed by the goal region 220 from the previously generated map 50 allows the navigation system 100 to localize the robot 10 within the map 50. In some examples, the high-level navigation system 110 sizes one or more constraint regions 230 to ensure that the robot 10 stays localized with the previously generated map 50. That is, when the robot 10 strays too far away from waypoints 510 and edges 520 from the previously generated map, the navigation system 100 may lose track of the location of the robot within the environment 8. To prevent this, the high-level navigation system 110 sizes the constraint region 230, based on, for example, the capabilities of the vision system 14 and the fidelity of the map 50, to keep the robot 10 localized within the map 50. The constraint regions 230 may include additional contextual information for the local navigation system 120, such as route cost information.

Figure 6:
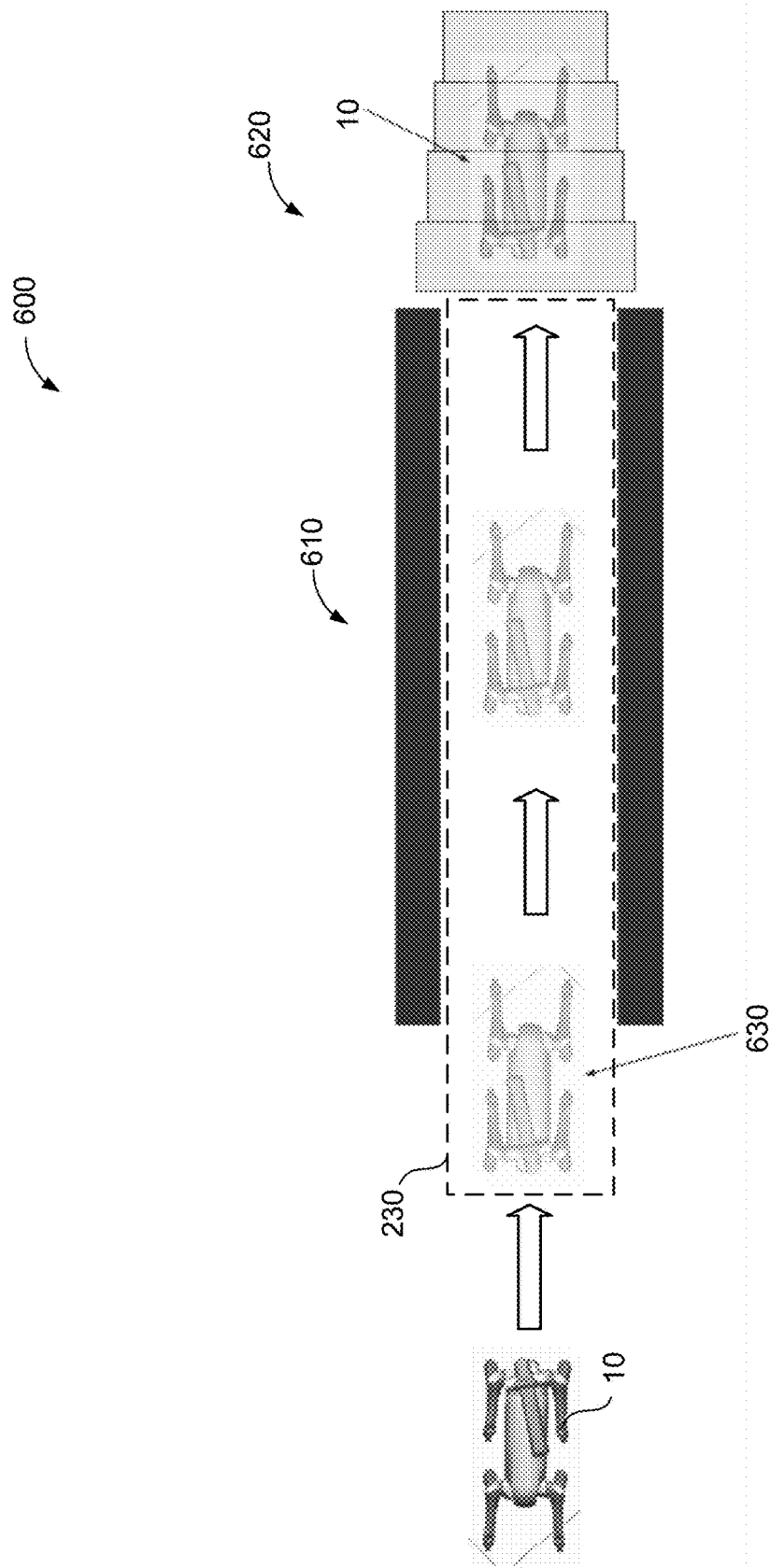
FIG. 6 is a schematic view of a constraint box applying orientation constraints to a robot prior to traversing a staircase.

Referring now to FIG. 6, in some examples, the high-level navigation system 110 solves for orientation constraints when generating the route specification 200. In the example shown, an exemplary environment 600 includes a narrow corridor 610 that proceeds a staircase 620. In some examples, it is beneficial for the robot 10 to traverse down stairs backwards to allow for additional space for the shins (e.g., lower portion 16 of each leg 12) of the robot 10. However, in this scenario, the narrow corridor 610 prohibits the robot 10 from turning around at the top of the staircase 620. In this situation, the robot 10 must turn prior to entering the corridor 610 and traverse the corridor 610 backwards. Accordingly, at location 630, the robot 10 executes a turning maneuver to re-orient itself backwards before entering the narrow corridor 61 so that the robot 10 may beneficially traverse down the staircase 620 backwards. By extending a constraint region 230 the entire length of the corridor 610, the constraint region may enforce an orientation constraint on the robot 10, thus commanding the robot 10 to turn around prior (e.g., at or near location 630) to entering the corridor 610.

Figure 7:
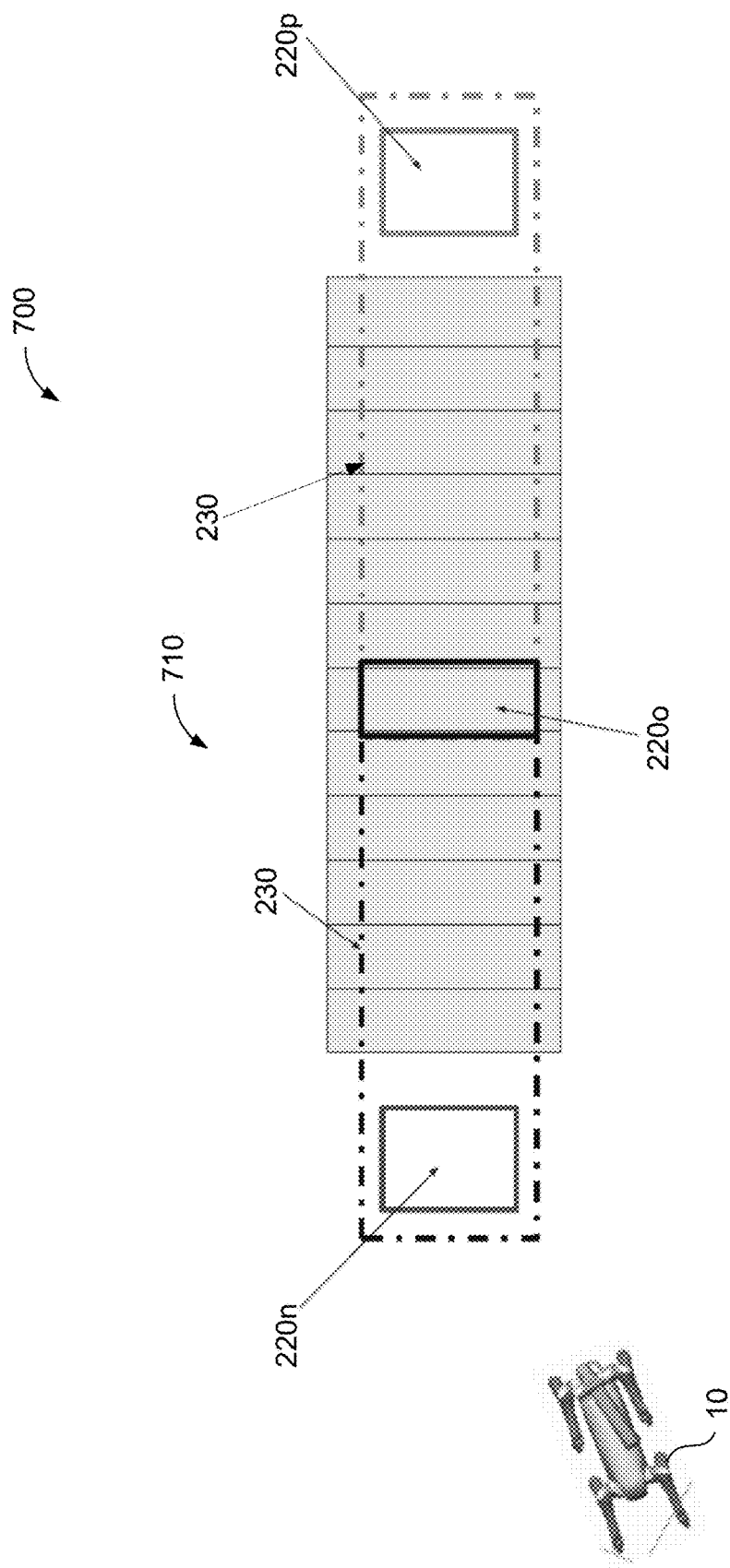
FIG. 7 is a schematic view of a plurality of goal regions helping a robot to navigate a staircase.

Referring now to FIG. 7, another exemplary environment 700 includes a staircase 710. Here, an initial goal region 220n ensures that the robot 10 is aligned with the staircase 710 prior to traversing the stairs. Note that in this example, there is not a constraint region 230 constraining the path of the robot to the initial goal region 220n as the high-level navigation system 110 determined that a constraint region 230 was not necessary in this situation. A second goal region 220o along the stairs allows the local navigation system 120 to notify the high-level navigation system 110 when the robot is passing positions of good localization in the environment 700. That is, in this example, the goal region 220o along the staircase 710 represents an area that allows the robot 10 to localize its location to the previously generated map 50. A final goal region 220p ensures that the robot 10 is properly off the stairs prior to allowing the robot 10 to turn to proceed to the next segment 210 (not shown). The constraint regions 230 provide the robot 10 with position bounds and costs to keep the robot 10 centered on the stairs and to keep the yaw of the robot 10 aligned with the direction of the stairs.

Figure 8:
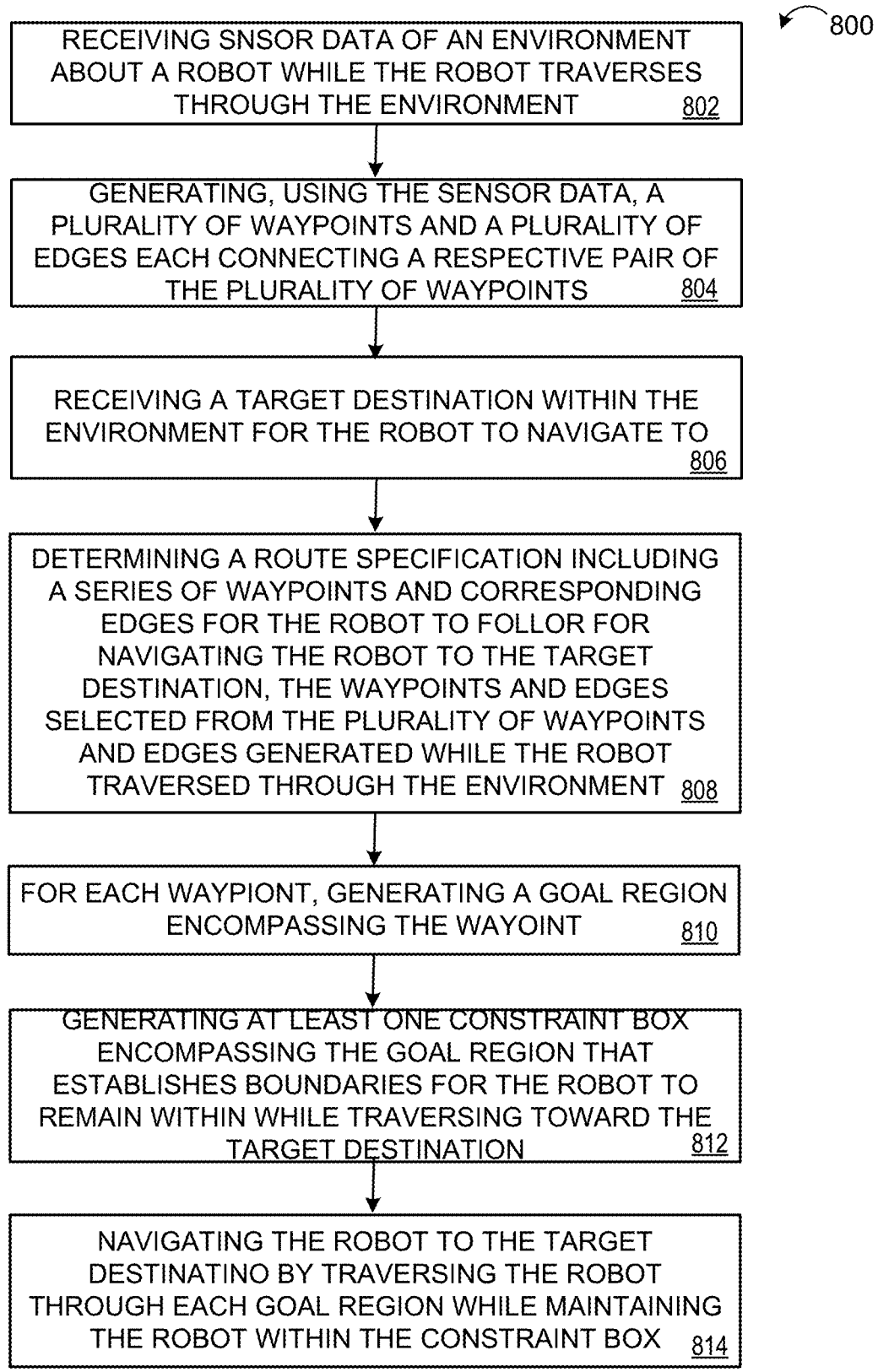
FIG. 8 is a flowchart of an example arrangement of operations for a method of providing constrained robot autonomy language.

FIG. 8 is a flowchart of an exemplary arrangement of operations for a method 800 of generating a route specification 200 from previous map 50 data for navigating a robot 10. At operation 802, the method 800 includes receiving, at data processing hardware 36, from at least one sensor 31 in communication with the data processing hardware 36, sensor data 17 of an environment 8 about a robot 10 while the robot 10 traverses through the environment 8. At operation 804, the method 800 includes generating, by the data processing hardware 36, using the sensor data 17 received while the robot 10 traverses through the environment 8, a plurality of waypoints 510 and a plurality of edges 520. Each edge 520 connects a respective pair of the plurality of waypoints 510.

After the robot 10 traverses through the environment 8, the method 800, at operation 806, includes receiving, at the data processing hardware 36, a target destination 46 within the environment 8 for the robot 10 to navigate to. At operation 808, the method 800 includes determining, by the data processing hardware 36, a route specification 200 includes a series of waypoints 510 and corresponding edges 520 for the robot 10 to follow for navigating the robot 10 to the target destination 46. The series of waypoints 510 and corresponding edges 520 are selected from the plurality of waypoints 510 and the plurality of edges 520 generated while the robot 10 traversed through the environment 8.

For each waypoint 510 in the series of waypoints 510 in the route specification 200, the method 800, at operation 810 includes, generating, by the data processing hardware 36, a goal region 220 encompassing the corresponding waypoint 510 in the route specification 200. At operation 812, the method includes generating, by the data processing hardware 36, at least one constraint box 230 encompassing at least one goal region 220. The at least one constraint box 230 establishes boundaries for the robot 10 to remain within while traversing toward the target destination 46. At operation 814, the method 800 includes navigating, by the data processing hardware 36, the robot to the target destination 46 by traversing the robot 10 through each goal region 220 while maintaining the robot 10 within the at least one constraint box 230.

Figure 9:
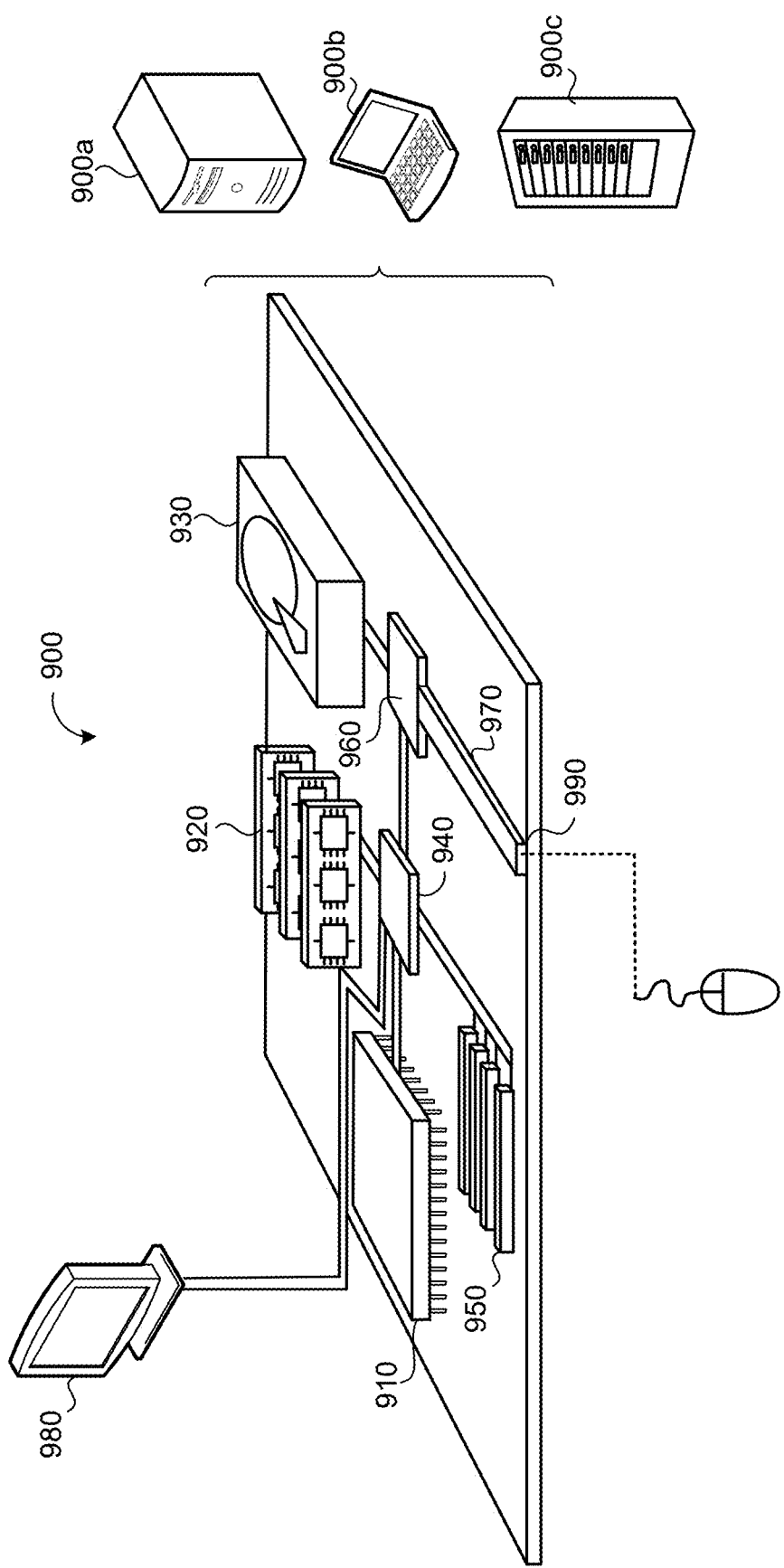
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot, comprising:
a body;
a plurality of legs;
at least one sensor configured to generate sensor data of an environment of the robot;
data processing hardware; and
memory hardware having stored thereon instruction that, when executed by the data processing hardware, cause the data processing hardware to:
receive a navigation command to navigate the robot to a target destination;
determine a route specification including a series of waypoints and corresponding edges for the robot to follow for navigating the robot to the target destination;
generate at least one constraint region encompassing at least one waypoint from the series of waypoints, the at least one constraint region establishing boundaries for the robot to remain within while traversing toward the target destination;
adjust an amount of margin distance between the robot and an obstacle based on a size of the at least one constraint region; and
navigate the robot to the target destination by traversing the robot through each of the series of waypoints while maintaining the robot within the at least one constraint region.

2. The robot of claim 1, wherein determining the route specification includes selecting the series of waypoints and corresponding edges from a map.

3. The robot of claim 2, wherein the instructions, when executed by the data processing hardware, further cause the data processing hardware to:
receive the sensor data from the at least one sensor while the robot traverses through the environment; and
generate the map.

4. The robot of claim 1, wherein the instructions, when executed by the data processing hardware, further cause the data processing hardware to:
generate at least one goal region encompassing the at least one waypoint; and
traverse a center point of the robot through the at least one goal region with a valid yaw configuration while navigating the robot to the target destination.

5. The robot of claim 4, wherein the at least one goal region comprises a yaw constraint configured to constrain a yaw of the robot within the at least one goal region.

6. The robot of claim 4, wherein the instructions, when executed by the data processing hardware, further cause the data processing hardware to:
generate a target region encompassing the target destination, the target region comprising a smaller area than the at least one goal region.

7. The robot of claim 6, wherein the target region comprises an area smaller than the at least one goal region.

8. The robot of claim 4, wherein the at least one goal region comprise two or more goal regions, and the at least one constraint region encompasses two of the two or more goal regions.

9. The robot of claim 8, wherein the instructions, when executed by the data processing hardware, further cause the data processing hardware to:
align the at least one constraint region with an edge connecting a pair of waypoints of the series of waypoints, the pair of waypoints each encompassed by a respective one of the two of the goal regions encompassed by the at least one constraint region.

10. The robot of claim 4, wherein the at least one goal region is configured to cause the robot to align with a terrain feature prior to the robot traversing the terrain feature.

11. The robot of claim 4, wherein the at least one goal region is configured to ensure localization information from previously captured sensor data is valid.

12. The robot of claim 1, wherein the instructions, when executed by the data processing hardware, further cause the data processing hardware to:
receive input from a user directing the robot to move about the environment; and
capture the sensor data of the environment as the robot moves about the environment.

13. The robot of claim 1, wherein the at least one sensor comprises an image sensor comprising one or more of a stereo camera, a scanning light-detection and ranging (LIDAR) sensor, or a scanning laser-detection and ranging (LADAR) sensor.

14. A non-transitory computer-readable medium having stored thereon instructions that, when executed by a data processing hardware, cause the data processing hardware to:
receive a navigation command to navigate a robot to a target destination, the robot comprising a body, a plurality of legs, and at least one sensor configured to generate sensor data of an environment of the robot;
determine a route specification including a series of waypoints and corresponding edges for the robot to follow for navigating the robot to the target destination;
generate at least one constraint region encompassing at least one waypoint of the series of waypoints, the at least one constraint region establishing boundaries for the robot to remain within while traversing toward the target destination;

adjust an amount of margin distance between the robot and an obstacle based on a size of the at least one constraint region; and navigate the robot to the target destination by traversing the robot through each of the series of waypoints while maintaining the robot within the at least one constraint region.

15. The non-transitory computer-readable medium of claim 14, wherein determining the route specification includes selecting the series of waypoints and corresponding edges from a map.

16. The non-transitory computer-readable medium of claim 15, wherein the instructions, when executed by the data processing hardware, further cause the data processing hardware to:

receive the sensor data from the at least one sensor while the robot traverses through the environment; and generate the map.

17. The non-transitory computer-readable medium of claim 14, wherein the instructions, when executed by the data processing hardware, further cause the data processing hardware to:

generate at least one goal region encompassing the at least one waypoint; and traverse a center point of the robot through the at least one goal region with a valid yaw configuration while navigating the robot to the target destination.

18. The non-transitory computer-readable medium of claim 17, wherein the at least one goal region comprises a yaw constraint configured to constrain a yaw of the robot within the at least one goal region.

19. The non-transitory computer-readable medium of claim 17, wherein the instructions, when executed by the data processing hardware, further cause the data processing hardware to:

generate a target region encompassing the target destination, the target region comprising a smaller area than the at least one goal region.

20. A method of robotic navigation, the method comprising:

receiving, by data processing hardware of a legged robot, a navigation command to navigate the legged robot to a target destination;

generating, by at least one sensor of the legged robot, sensor data of an environment of the legged robot;

determining, by the data processing hardware, a route specification including a series of waypoints and corresponding edges for the legged robot to follow for navigating the legged robot to the target destination;

generating, by the data processing hardware, at least one constraint region encompassing at least one waypoint of the series of waypoints, the at least one constraint region establishing boundaries for the legged robot to remain within while traversing toward the target destination;

adjusting, by the data processing hardware, an amount of margin distance between the legged robot and an obstacle based on a size of the at least one constraint region; and navigating, by the data processing hardware, the legged robot to the target destination by traversing the legged robot through each of the series of waypoints while maintaining the legged robot within the at least one constraint region.

* * * * *